United States Patent [19]

Skudera, Jr. et al.

[11] Patent Number: 5,424,674

[45] Date of Patent: * Jun. 13, 1995

[54] WIDE DYNAMIC RANGE DETECTION CIRCUIT

[75] Inventors: William J. Skudera, Jr., Oceanport; Elio A. Mariani, Hamilton Square; Stuart D. Albert, Bricktown, all of N.J.

[73] Assignee: The United States of America as represented by the Secretary of the Army, Washington, D.C.

[*] Notice: The portion of the term of this patent subsequent to Oct. 23, 2007 has been disclaimed.

[21] Appl. No.: 977,942

[22] Filed: Nov. 18, 1992

[51] Int. Cl.[6] .............................................. H04B 1/10
[52] U.S. Cl. .................................... 327/552; 342/19; 342/159; 327/551; 327/47
[58] Field of Search ............... 333/202; 342/132, 17, 342/18, 19, 13, 148, 151, 159, 192; 375/1; 307/362, 354, 521, 520; 328/165, 167

[56] References Cited

U.S. PATENT DOCUMENTS

| | | | |
|---|---|---|---|
| 4,301,454 | 11/1981 | Barley | 342/13 |
| 4,965,581 | 10/1990 | Skudera et al. | 342/19 |
| 4,994,740 | 2/1991 | Skudera et al. | 324/76.19 |
| 5,221,912 | 6/1993 | Kean et al. | 333/202 |

OTHER PUBLICATIONS

W. Skudera, "SAW Tapped Delay Lines for New Potential Circuit Applications," *Proceedings of the 42nd Annual Frequency Control Symposium 1988*, IEEE Catalog No. 88CH2588-2, Library of Congress No. 58-60781.

U.S. Pat. Appln. Ser. No. 07/886,203 filed May 21, 1992, by S. Albert et al.
J. McCole et al., "Applications of YIG Devices," Microwaves, Sep. 1965.
Widrow et al., "Adaptive Noise Cancelling: Principles and Applications", *Proceedings of the IEEE*, vol. 63, No. 12, Dec. 1975.
Panasik et al., "Programmable Filter Technology for Integrated Communication, Navigation and Identification Systems," Proceedings of the 1982 IEEE National Aerospace and Electronics Conference, vol. 3, pp. 1074–1080.

Primary Examiner—Timothy P. Callahan
Assistant Examiner—Dinh Le
Attorney, Agent, or Firm—Michael Zelenka; William H. Anderson

[57] ABSTRACT

Two wide dynamic range detection circuits are disclosed, which are capable of detecting low-level desired signals in the presence of nearby strong interfering signals. Each circuit includes an attenuator scheme for attenuating the interfering signal while passing the desired signal. The first attenuator scheme uses a YIG filter in combination with an automatic gate arrangement. The second attenuator scheme uses a two-channel arrangement. The first channel uses a chirp-Z processor to derive a pulse-type transform signal in response to the strong interference signal. The second channel includes a YIG filter followed by a programmable notch filter which is controlled by the interference-signal pulse from the first channel. Following the programmable notch filter in the second channel is a chirp-Z processor followed by a gate arrangement wherein the gates are switched "OFF" under control of the interference-signal pulse from the first channel.

17 Claims, 4 Drawing Sheets

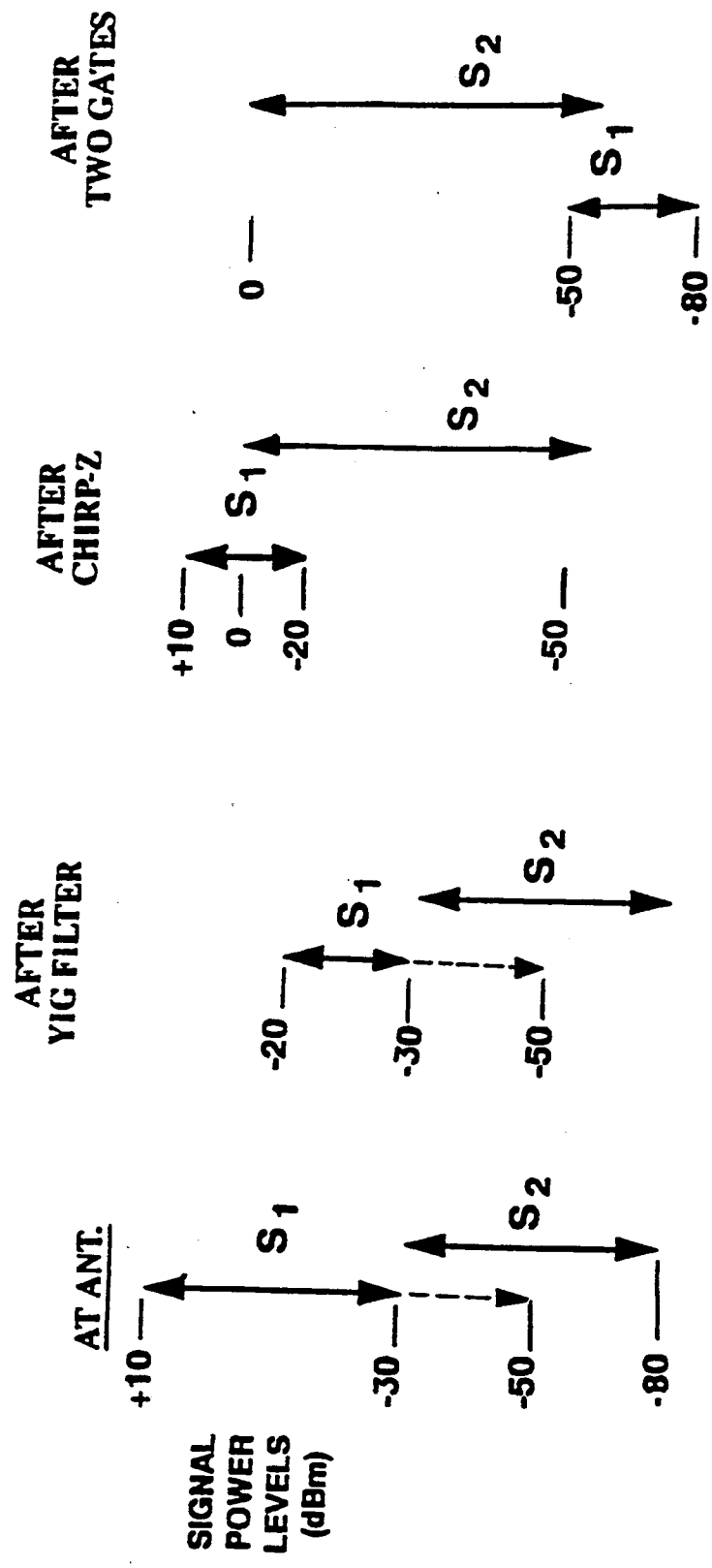

WIDE DYNAMIC RANGE DETECTION CIRCUIT

The invention described herein may be manufactured, used and licensed by or for the Government for Governmental purposes without payment to the inventors of any royalties.

BACKGROUND OF THE INVENTION

1. Field of the Invention

This invention relates to the field of COMINT/ELINT (communications intelligence/electronic intelligence) signal processing, and more particularly to a circuit with which very low-level to moderate-level signals can be detected, without any a priori information, while other stronger signals are present and transmitting close to the instantaneous frequency of the desired signal.

2. Background Art

Reference is made to U.S. Pat. No. 4,965,581 entitled, "Real Time Rejection Circuit to Automatically Reject Multiple Interfering Hopping Signals While Passing A Lower Level Desired Signal" by W. Skudera & S. Albert, issued Oct. 23, 1990 (hereinafter "the '581 patent").

Reference is also made to a paper entitled "SAW Tapped Delay Lines for New Potential Circuit Applications" by William J. Skudera, Jr., which was published in approximately September 1988 in the *Proceedings of the 42nd Annual Frequency Control Symposium* 1988, IEEE Catalog No. 88CH2588-2, Library of Congress No. 58-60781 (hereinafter "the 1988 article"); and to U.S. Pat. No. 5,384,545, filed 17 Nov., 1992 in the name of William J. Skudera, Jr., titled "Sequential Circuitry for Recreating CW Components from Chirp-Z Pulses," and the 1988 article describe several embodiments of circuits which use a tapped delay line in an amplifier feedback loop circuit to replace the inverse transform of a chirped Fourier transform processor for CW input signals. The conventional inverse transform processor loses on the order of 20–30 dB of the processing gain achieved by the forward processor. However, the described circuit can be utilized to recirculate the signal in order to recreate a continuous CW signal from the transform signal.

In addition, reference is made to FIG. 2 of U.S. Pat. No. 5,355,091 filed May 21, 1992 in the names of Stuart D. Albert and William J. Skudera, Jr. entitled, "Apparatus and Method for Real Time Interference Signal Rejection" ('091 patent).

The disclosures of these and all other prior art materials referred to herein are expressly incorporated by reference.

Conventional methods have failed to achieve detection of very weak desired signals under adverse conditions and without a priori information about the received signals, because such detection requires a circuit with both ultra-wide dynamic range and very high signal sensitivity. The receiver must be able to receive moderate- to very-low-level signals without becoming saturated and therefore being made inoperable by the strong signals.

SUMMARY OF THE INVENTION

These and other objects are satisfied by a wide dynamic range detection circuit for detecting low-level desired signals in the presence of nearby strong interfering signals, comprising receiving means for receiving electromagnetic signals including at least a desired signal and a strong interfering signal on a nearby frequency; attenuating means for attenuating the interfering signal to a given degree while attenuating the desired signal to a substantially lesser degree; first chirp-Z processing means for receiving the output of the attenuating means and producing respective chirp-Z transforms of the desired and interfering signals; modulating gate means which receives the output of the first chirp-Z processing means and is responsive to the chirp-Z transform of the interfering signal, for selectively blocking the interfering signal transform while passing the desired signal transform; and first detecting means for detecting the desired signal transform and generating an output indicative of such detection.

The attenuating means may comprise a frequency-selective YIG filter and/or a programmable notch filter, for example.

The modulating gate means may comprise one or two modulator gates which block the chirp-Z transform of the interfering signal and pass the chirp-Z transform of the desired signal. The modulator gates may be responsive to the interfering signal transform produced by the first chirp-Z processing means, or to an interfering signal transform produced by a second chirp-Z processing means.

The detecting means may comprise a peak detection circuit and/or a recirculation loop for recreating the desired signal from the chirp-Z transform of the desired signal. A second detecting means may be provided for detecting the interfering signal transform and generating an output indicative of such detection. The second detecting means may comprise a peak detector circuit. Summing means may be provided for receiving and summing the outputs of the first and second detecting means and generating a summed output.

The disclosed embodiments of the invention provide circuits which are capable of receiving and detecting very-low-level and moderate-level desired signals, while at the same time removing unwanted high-power interference signals. The circuits further are able to operate over a wide instantaneous band-width and are able to handle multiple simultaneous signals.

More specifically, in the second embodiment of the invention, the sensitivity of the passive chirp-Z transform is increased by 30 dB, to a value of −120 dBm, over a substantial bandwidth, for example 50 MHz. The second embodiment is capable of operating accurately in the presence of +10 dBm signals while maintaining a sensitivity of −110 dBm, thus achieving an effective dynamic range of 120 dB. The second embodiment is further capable of handling and characterizing the interference signal separately, if its signal characterization is desired.

Other features and advantages of the present invention will become apparent from the following description of the invention which refers to the accompanying drawings.

BRIEF DESCRIPTION OF THE DRAWINGS

FIGS. 1A and 1B are respectively a schematic block diagram of a first embodiment of the invention, and a diagram showing signal levels at various points within the first embodiment.

DETAILED DESCRIPTION OF EMBODIMENTS OF THE INVENTION

First Embodiment

Figure 1A:
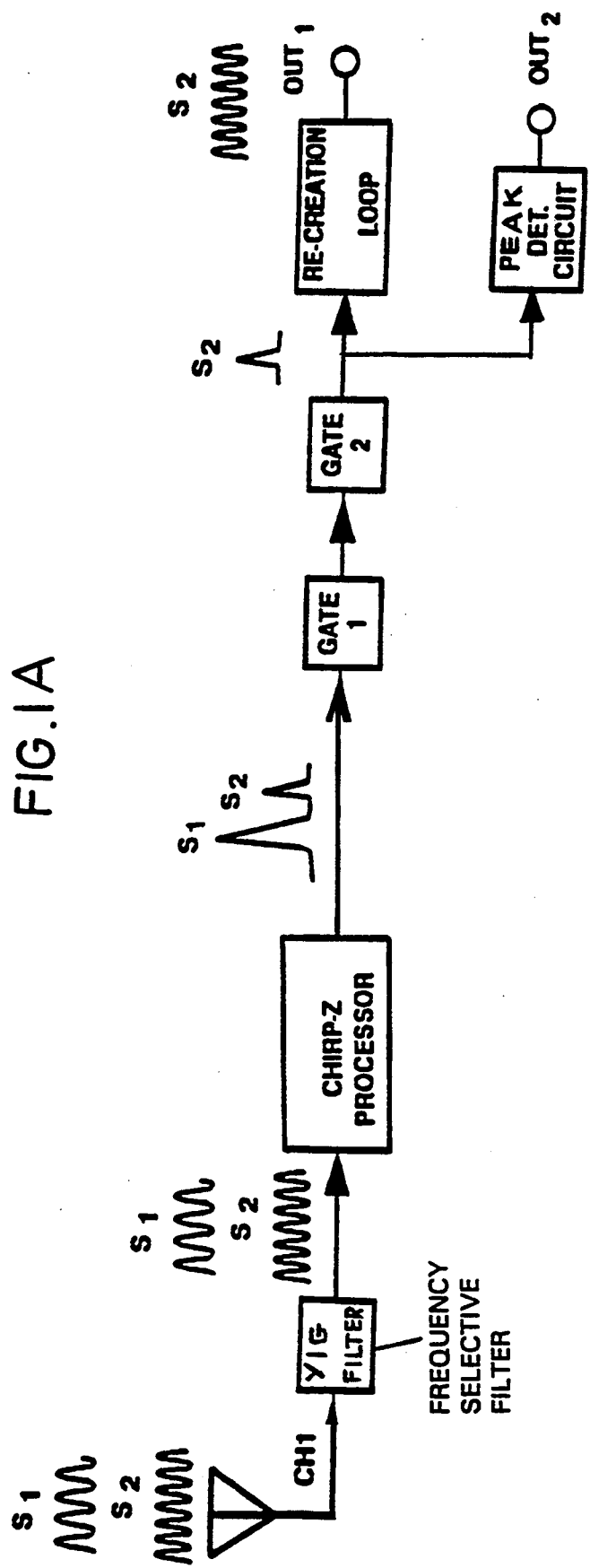

FIG. 1A shows a circuit which is capable of improving the effective dynamic range of a chirp-Z processor by up to 30 dB by utilizing a frequency selective type filter, such as a YIG filter, which limits only high-power signals by a factor of the order of 30 dB or more, while allowing lower level signals to go through essentially unaffected. Such a filter is placed before the chirp-Z processor described in the '581 patent, which allows the chirp-Z processor to operate at reasonably low sensitivity level without becoming saturated by high-level signals. The operation of the YIG limiting filter is well known per se, and is described in an article entitled, "Application of YIG Devices" by J. McCole and A. Shaw, in Microwaves, September 1965.

FIG. 1B schematically shows an example of signals which are handled by the circuit of FIG. 1A. In FIG. 1B, a strong signal S1, whose signal strength could, for example, be in the range of $-30$ to $+10$ dBm, is shown attenuated to $-30$ to $-20$ dBm by the YIG filter, while the desired signal S2 is shown unaffected, although in practice there may be 1 to 2 dB of insertion loss. The desired signal usually has a low signal strength that usually is well below the $-30$ dBm level because of the typical transmitting distances involved.

After going through the chirp-Z processor both signals are enhanced by the order of 30 dB.

Then signals S1 and S2 are both passed through a pair of modulator gates Gate 1 and Gate 2. As discussed in the '581 patent, each modulator gate blocks the time-domain pulses that represent the chirp-Z transform of the strong interfering signal, but passes the chirp-Z transform of the low-level desired signal. Each gate therefore has the effect of lowering the S1 signal without affecting the S2 signal. For example, Gates 1 and 2 may each lower signal S1 by approximately 30 dB. Thus, after the two gates, the desired signal S2 is well above the interference signal S1. Signal S2 can then be detected using a standard peak detector circuit, or if the signal is modulated, it can be supplied to a recirculation loop, as explained in the 1988 article, for recreation of the original S2 signal.

The circuit of FIG. 1A, therefore, effectively achieves an excellent dynamic range of 90 dB.

A S/N ratio of 6–10 dB is generally considered to be preferable for producing a good output signal. Therefore, to achieve a more useful dynamic range, the lower input range of signal S2 advantageously would be increased by 10 dB to $-70$ dBm to yield a minimum S/N of 10 dB (the minimum S2 to the noise level), or a useful dynamic range of 80 dB, over a bandwidth, for example, of 50 MHz.

Second Embodiment

Figure 2A:
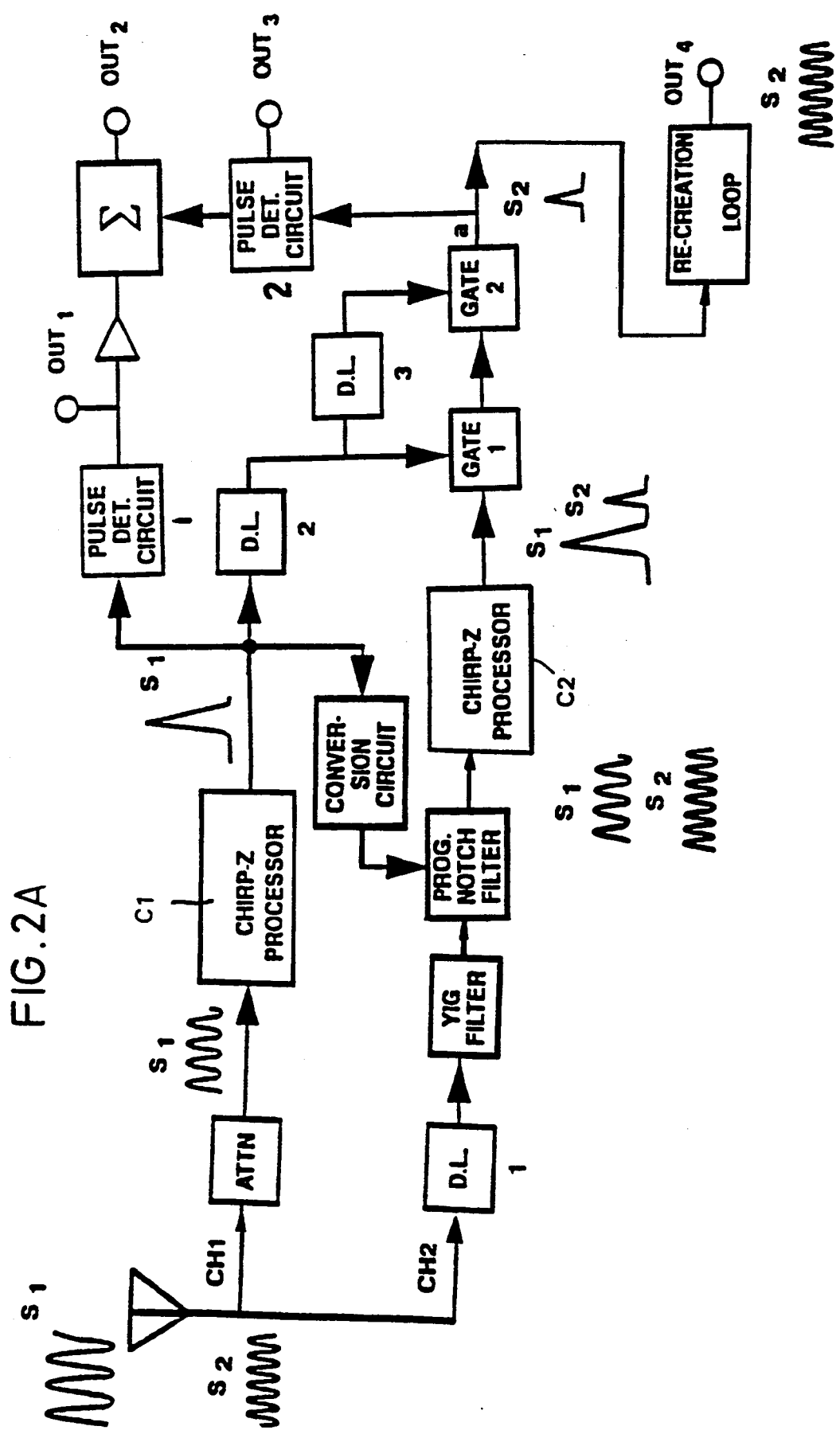
FIGS. 2A and 2B are respectively a schematic block diagram of a second embodiment of the invention, and a diagram showing signal levels at various points within the second embodiment.

FIG. 2A shows a circuit that extends the effective operational dynamic range to 120 dB via a two-channel arrangement. A first channel CH1 receives the interference signal (S1 in this example), which is considered to be a high-level signal ($-50$ to $+10$ dBm), and the desired signal S2. After processing by a resistive attenuator ATTN, only the interference signal S1 remains above the sensitivity level Smin. of the chirp-Z processor. The other channel CH2 is protected from the high-level signal by both a YIG filter and a programmable notch filter circuit as explained in FIG. 2 of the '091 patent. Thus the signal S1 is substantially reduced, while the desired signal S2 is substantially unaffected.

After the attenuator ATTN in channel CH1, the signal S1 is supplied to chirp-Z processor C1 which outputs a pulse-like transform, as is well known.

The chirp-Z processor C2 in the second channel CH2 receives the signals S1 and S2 from the notch filter and outputs a corresponding pair of pulse-like transform signals.

The processor C2 can be optimized to receive very low signals, from $-120$ to $-60$ dBm, via the use of a proper amount of gain in the circuit, since it can have resolution of the order of 20 kHz and is, therefore, approximately equivalent to a narrow band circuit. This is shown by equation (1) below:

$$S_{min.} = -114 \text{ dBm } (KT \text{ level for 1 MHz}) + 10 \log (BW) + NF - PG \quad (1)$$

wherein:

KT is the thermal noise floor,
BW is the RF bandwidth in MHz,
NF is the noise figure of the circuit, and
PG is the processing gain of the dispersive filter used in the chirp-Z processor.

For example, if one uses typical values for the above equation, such as: NF=3.0 dB, BW=50 MHz, and PG=10*Log(T*BW), where T=time=50 us, then Smin.= $-114+17+3-34 = -128$ dBm. By comparison, a standard narrow-band (20 kHz) receiver would obtain approximately the same Smin., referring to equation (1), with PG=zero because dispersive filters could not be employed, and because 10*log(0.020)= $-17$ dB.

It is further to be noted that 6 to 10 dB should be allowed for pulse detection/threshold, although this was omitted from equation (1), and that other component losses were assumed to be negligible. Therefore, in practice, the Smin. could be of the order of 10 dB less. In addition, equation (1) assumes an input signal duration equal to or greater than the SLO (sweeping local oscillator) period of the chirp-Z processor to achieve a maximum processing gain.

Figure 2B:
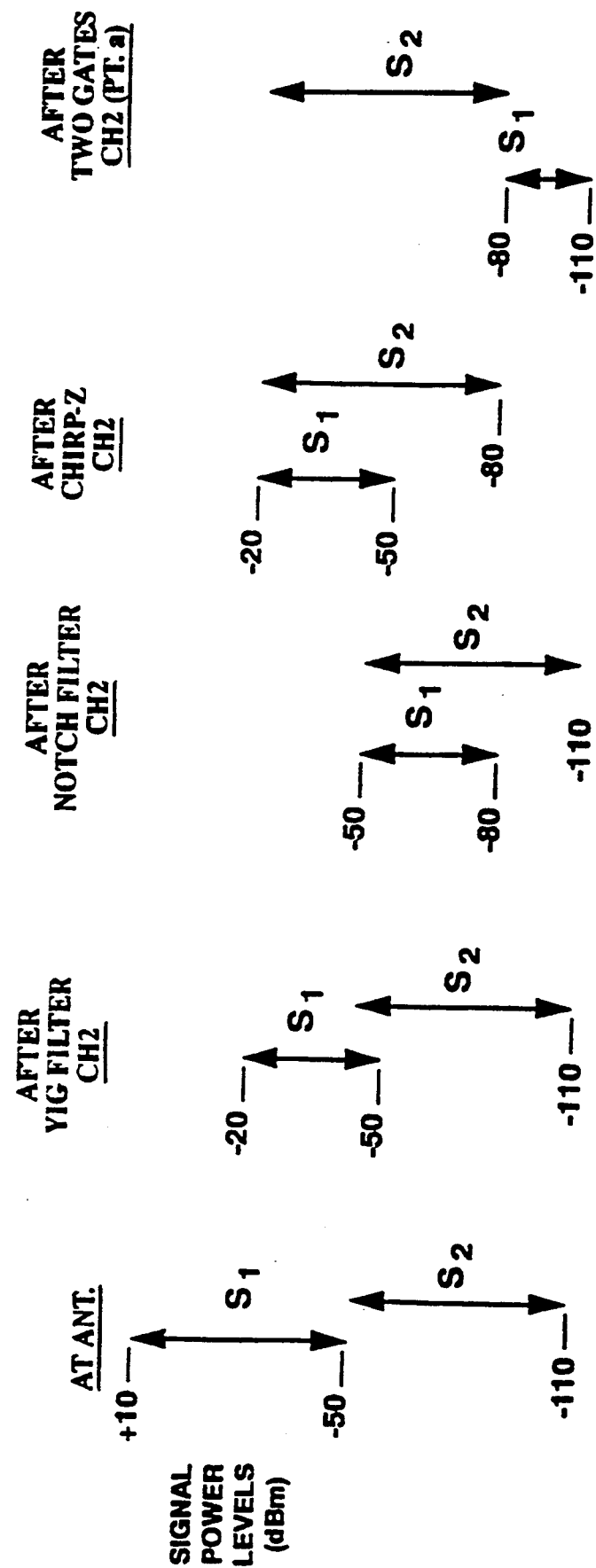

It is further to be noted that in FIG. 2B an Smin. value of $-110$ is shown instead of $-120$. The reason for using the higher value is that YIG filters generally limit between $-20$ to $+10$ dBm. Therefore, if one wanted the dynamic range to extend from $-120$ to 0 dBm, then a second notch filter could be utilized in place of the YIG filter.

The output from the chirp-Z processor C1 in channel CH1, which is the chirp-Z transform of the interference signal S1, is used to control the notch filter, as described in the '203 application. The notch and YIG filters reduce the signal S1 entering the chirp-Z processor C2 in channel CH2 by a total of 60 dB. Then, the two modulator gates Gate 1 and Gate 2 reduce the S1 signal from processor C2 by another 60 dB, as explained in the '581 patent, with negligible effect on signal S2. However, in this case the gates are controlled "OFF" by the signal S1 from the chirp-Z processor C1, as opposed to an automatic-type control scheme as disclosed in the '581 patent.

After passing through Gate 2, the transform of the desired signal S2 can be converted to a CW-type signal via the re-creation loop as explained in the 1988 article or in U.S. Pat. No. 5,384,545, filed 17 Nov., 1992 in the name of William J. Skudera, Jr., titled "Sequential Circuitry for Recreating CW Components from Chirp-Z Pulses," and then provided to output OUT4. Alternatively, the transform signal S2 could be detected via a standard peak-detection-type circuit (PULSE DET. CIRCUIT 2 in FIG. 2A), whose output is then provided to output OUT3.

In addition, as shown in FIG. 2A, one can peak-detect both channels (see PULSE DET. CIRCUIT 1) and either look at the outputs separately (outputs OUT1 and OUT3, respectively) or combine then in a summer (Σ) which has output OUT2. Thus, if the receiver is dealing with a single input signal, then output OUT2 will yield a continuous 120 dBm range.

If one wants to characterize the interference signal S1 separately, then output OUT1 is utilized. If just the desired signal S2 is to be detected, then output OUT3 is used. Also, if a CW version of the desired signal S2 is required, then output OUT4 is used, wherein the signal goes through the recreation loop described in the 1988 article.

It is to be noted that the function of the three delay lines shown in FIG. 2A is to keep the signals tracking in the two channels and through the two gates.

The signal sketches drawn in FIG. 2A, and the signal power levels of each signal shown in FIG. 2B at various locations along channel CH2, are utilized only to simplify the explanation of the circuit operation and are not intended to limit the scope of the invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wide dynamic range detection circuit for detecting low-level desired signals in the presence of nearby strong interfering signals, comprising:
   receiving means for receiving electromagnetic signals including at least a desired signal and a strong interfering signal on a nearby frequency;
   attenuating means for attenuating the interfering signal to a given degree while attenuating the desired signal to a substantially lesser degree;
   first chirp-z processing means for receiving the output of the attenuating means and producing a first chirp-z transform of the desired signal and a second chirp-z transform of the interfering signal;
   modulating gate means which receives the output of the first chirp-z processing means and is responsive to the second chirp-z transform of the interfering signal, for selectively blocking the second chirp-z transform of the interfering signal while passing the first chirp-z transform of the desired signal; and
   first detecting means for detecting the first chirp-z transform of the desired signal and generating a first output indicative of such detection.

2. A detection circuit as in claim 1, wherein said attenuating means comprises a frequency-selective YIG filter.

3. A detection circuit as in claim 1, wherein said modulating gate means comprises a first modulator gate which blocks the second chirp-z transform of the interfering signal and passes the first chirp-z transform of the desired signal.

4. A detection circuit as in claim 3, wherein said modulating gate means further comprises a second modulator gate for further blocking the second chirp-Z transform of the interfering signal and passing the first chirp-Z transform of the desired signal.

5. A detection circuit as in claim 1, wherein said first detecting means comprises a peak detection circuit.

6. A detection circuit as in claim 1, wherein said first detecting means comprises a recreation loop for recreating the desired signal from the first chirp-Z transform of the desired signal.

7. A detection circuit as in claim 1, further comprising a second chirp-Z processing means for receiving the output of said receiving means and producing a third chirp-Z transform of the interfering signal.

8. A detection circuit as in claim 7, further comprising a second detecting means for detecting said third chirp-Z transform of the interfering signal and generating a second output indicative of such detection.

9. A detection circuit as in claim 8, wherein said second detecting means comprises a peak detector circuit.

10. A detection circuit as in claim 9, further comprising a summing means for receiving and summing the first and second outputs of the first and second detecting means and generating a summed output.

11. A detection circuit as in claim 10, wherein said first detecting means comprises a peak detector circuit.

12. A detection circuit as in claim 1, wherein said modulating gate means is responsive to the second chirp-Z transform of the interfering signal generated by the first chirp-Z processing means.

13. A detection circuit as in claim 7, wherein said modulating gate means is responsive to the third chirp-Z transform of the interfering signal generated by the second chirp-Z processing means.

14. A detection circuit as in claim 13, wherein said attenuating means comprises a programmable notch filter responsive to the third chirp-Z transform of the interfering signal generated by the second chirp-Z processing means.

15. A detection circuit as in claim 14, wherein said attenuating means further comprises a frequency-selective YIG filter.

16. A detection circuit as in claim 7, wherein said attenuating means comprises a programmable notch filter responsive to the third chirp-Z transform of the interfering signal generated by the second chirp-Z processing means.

17. A detection circuit as in claim 16, wherein said attenuating means further comprises a frequency-selective YIG filter.

* * * * *